United States Patent
Suzuki

(10) Patent No.: US 11,124,230 B2
(45) Date of Patent: Sep. 21, 2021

(54) STEERING CONTROLLER

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 16/560,074

(22) Filed: Sep. 4, 2019

(65) Prior Publication Data

US 2020/0079423 A1   Mar. 12, 2020

(30) Foreign Application Priority Data

Sep. 7, 2018   (JP) .............................. JP2018-167873

(51) Int. Cl.
| | | |
|---|---|---|
| *B62D 6/00* | (2006.01) | |
| *B62D 5/00* | (2006.01) | |
| *B62D 1/185* | (2006.01) | |
| *B62D 1/187* | (2006.01) | |
| *B62D 1/181* | (2006.01) | |

(52) U.S. Cl.
CPC ............. *B62D 6/008* (2013.01); *B62D 1/181* (2013.01); *B62D 1/185* (2013.01); *B62D 1/187* (2013.01); *B62D 5/005* (2013.01)

(58) Field of Classification Search
CPC ........ B62D 6/008; B62D 5/005; B62D 1/185; B62D 1/187; B62D 1/181; B62D 6/007; B62D 5/046; B62D 6/002
USPC ......................................................... 701/41
See application file for complete search history.

(56) References Cited

U.S. PATENT DOCUMENTS

| | | | | |
|---|---|---|---|---|
| 5,226,499 A | * | 7/1993 | Kanazawa ............. | B62D 7/159 180/412 |
| 2002/0125063 A1 | * | 9/2002 | Kurishige ............. | B62D 5/0466 180/443 |
| 2004/0193344 A1 | * | 9/2004 | Suzuki ................. | B62D 5/0484 701/41 |
| 2005/0203705 A1 | * | 9/2005 | Izumi ..................... | B62D 6/002 701/301 |
| 2008/0021612 A1 | * | 1/2008 | Sakuma ................. | B62D 6/008 701/41 |
| 2008/0199160 A1 | * | 8/2008 | Yamazaki ............. | B62D 5/0469 388/815 |
| 2008/0201041 A1 | * | 8/2008 | Jiang ....................... | H02P 21/04 701/42 |
| 2016/0107649 A1 | * | 4/2016 | Takeuchi ............... | B62D 6/007 701/70 |
| 2018/0111642 A1 | * | 4/2018 | Endo ....................... | B62D 6/008 |

* cited by examiner

FOREIGN PATENT DOCUMENTS

| | | |
|---|---|---|
| JP | H02-227381 A | 9/1990 |
| JP | 2005-254835 A | 9/2005 |
| JP | 2016-159782 A | 5/2016 |

*Primary Examiner* — Jonathan M Dager
*Assistant Examiner* — Jean W Charleston
(74) *Attorney, Agent, or Firm* — Maschoff Brennan

(57) ABSTRACT

A steering controller sets a steer angle ratio to a high value in a high angle ratio mode that is high relative to a reference value in a normal mode. A control section controls operation of a reaction force motor and a tire turning motor based on a steer angle ratio mode input to a switch. The control section controls an output of the reaction force motor provided for a driver based on (i) a "reaction force amount" based on road surface information calculated from output of the tire turning motor and (ii) a "viscosity compensation amount" negatively correlated with a steering speed of a steering device.

8 Claims, 13 Drawing Sheets

STEERING CONTROLLER

CROSS REFERENCE TO RELATED APPLICATION

The present application is based on and claims the benefit of priority of Japanese Patent Application No. 2018-167873, filed on Sep. 7, 2018, the disclosure of which is incorporated herein by reference.

TECHNICAL FIELD

The present disclosure generally relates to a steering controller.

BACKGROUND INFORMATION

In the related art, there is known a technique in which, an angle ratio of a tire turning angle to a steering angle is made variable in a steering apparatus.

For example, a driver can selectively input a variable mode in which the steer angle ratio is variable (i.e., changeable) and a fixed mode in which the steer angle ratio is fixed.

SUMMARY

It is an object of the present invention to provide a steering controller in a steer-by-wire system having a variable steer angle ratio, which prevents a control of the steering wheel from being taken over by an input from the road surface when the steer angle ratio is high.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A steering controller is described with reference to plural embodiments shown in the accompanying drawings. The steering controller of each of the following embodiments is applied to a steer-by-wire system in which a steering device and a tire turning device are mechanically separated. In the following embodiments, the like configuration has a like number, for the brevity of and not repeating the description of the like configuration. Further, any of the embodiments may collectively be referred to as a "present embodiment."

First Embodiment

Figure 1:
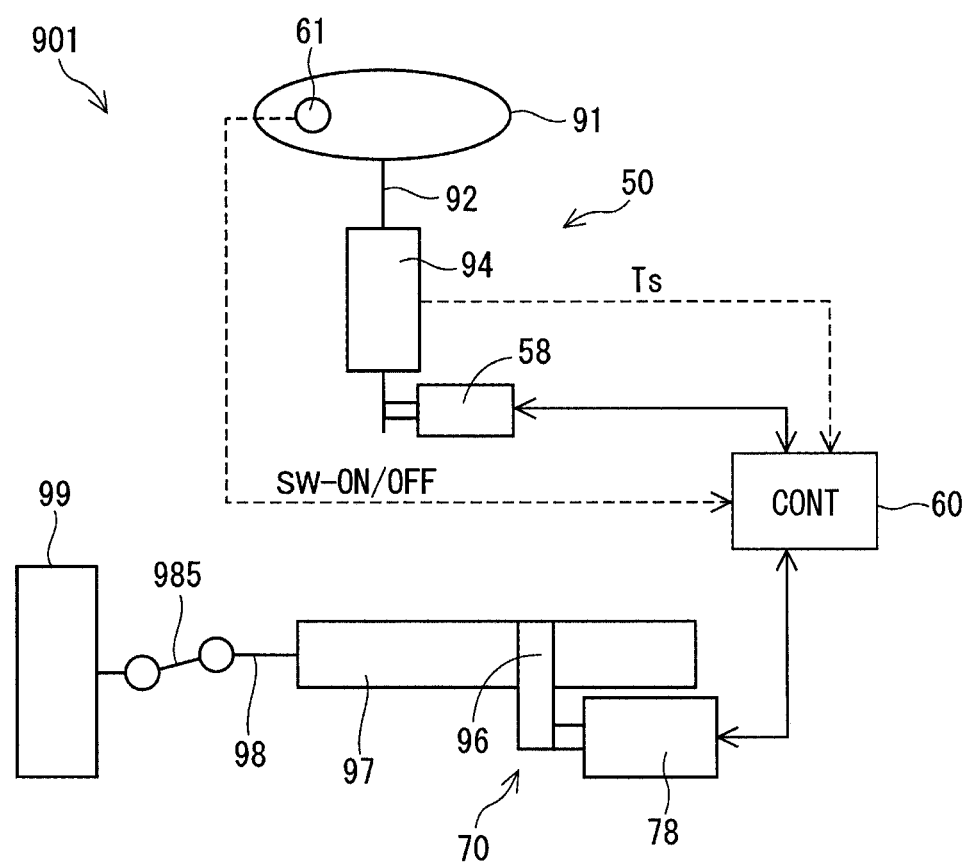
FIG. 1 is a configuration diagram of a steer-by-wire system to which a steering controller according to a first embodiment is applied.

The first embodiment is described with reference to FIG. 1 to FIG. 8. FIG. 1 shows a configuration of a steer-by-wire system 901 to which a steering control apparatus of the first embodiment is applied. In the steer-by-wire system 901, a steering device 50 and a tire turning device 70 are mechanically separated. In FIG. 1, one of tires 99 is shown, and the illustration of the opposite side tire is omitted.

The steering device 50 includes a steering wheel 91, a steering shaft 92, a torque sensor 94, a reaction force motor 58 as a "reaction force actuator", and the like. The steering wheel 91 is disposed on one end of the steering shaft 92. The torque sensor 94 detects a steering torque Ts applied to the steering shaft 92 based on the torsional displacement of the torsion bar.

In the steer-by-wire system 901, a driver cannot directly sense or feel a reaction force against a steering operation. Therefore, the reaction force motor 58 rotates the steering wheel 91 so as to apply a reaction force against the steering operation, and provides an appropriate steering feel to the driver. Further, in the first embodiment, a high angle ratio switch 61, which can be operated by the driver, is provided on the steering wheel 91 as an "input device."

The tire turning device 70 includes a pinion gear 96, a rack shaft 97, a tie rod 98, a knuckle arm 985, a tire turning motor 78 as a "turning actuator" and the like, and transmits the rotation of the tire turning motor 78 to the tire 99. Specifically, when the pinion gear 96 is rotated by the rotation of the tire turning motor 78, a rotational motion of the pinion gear 96 is converted into a linear motion of the rack shaft 97 by a rack and pinion mechanism. The direction of the tire 99 is changed by the tie rod 98 that is provided at both ends of the rack shaft 97 for reciprocally moving the knuckle arm 99. Thereby, a pair of tires 99 is steered to an angle corresponding to the displacement amount of the rack shaft 97.

The control section 60 is electrically connected to the reaction force motor 58 and the tire turning motor 78, and controls the outputs of the reaction force motor 58 and the tire turning motor 78. The reaction force motor 58, the tire turning motor 78, the high angle ratio switch 61, and the control section 60 constitute a "steering controller." The control section 60 is mainly composed of a microcomputer or the like, and internally includes, although not shown, a CPU, a ROM, a RAM, an I/O, a bus line for connecting these components, and the like. Each processing executed by the control section 60 may be software processing or may be hardware processing. The software processing may be implemented by causing the CPU to execute a program. The program may be stored beforehand in a memory device such as a ROM, that is, in a readable non-transitory, tangible storage medium. The hardware processing may be implemented by a special purpose electronic circuit.

Further, from the viewpoint of layout, the control section 60 may be arranged in one place, or may be arranged to be divided into a plurality of locations and communicate information with each other through a communication line. For example, a part that controls the reaction force motor 58 may be configured integrally with the stator, the rotor, and the like of the reaction force motor 58, which may be a so-called "control-mechanism integrated type." The control-mechanism integrated type motor is well known in the field of electric power steering apparatus. Similarly, a part for controlling the tire turning motor 78 may be integrally formed with the stator, the rotor, etc. of the tire turning motor 78.

Hereinafter, a ratio of a tire turning angle θt of the tire 99 to a steering angle θs of the steering wheel 91 is defined as "steer angle ratio (θt/θs)." A mode in which the steer angle ratio is set to a reference value is defined as "normal mode", and a mode in which the steer angle ratio is set to a value higher than the reference value is defined as "high angle ratio mode." The driver can select and input a steer angle ratio mode either as the normal mode or the high angle ratio mode by turning ON/OFF the high angle ratio switch 61 serving as the "input device." In the specification, the high angle ratio switch 61 may be abbreviated as a "switch 61" where appropriate.

Therefore, as indicated by a broken line arrow in FIG. 1, information on the steering torque Ts from the torque sensor 94 and switch ON/OFF information from the high angle ratio switch 61 are input to the control section 60. As indicated by a solid line arrow, the control section 60 acquires information such as torque, electric current, rotation angle, etc. from the reaction force motor 58 and the tire turning motor 78, while supplying drive signals to the reaction force motor 58 and the tire turning motor 78.

Note that a steer angle ratio with good operability differs depending on the driving situation. For example, when a vehicle is traveling at high speed, the straight travel stability is obtained with the steer angle ratio being set to a small value, and when a vehicle is parked at a low speed or the like, the steer angle ratio being set to a high value improves maneuverability.

In the present embodiment applied to the steer-by-wire system, the steering angle θs and the tire turning angle θt are independently controllable by using the reaction force motor 58 and the tire turning motor 78 even without implementing a variable gear ratio. Also, when changing the steer angle ratio mode, it makes (a) the generation of the steering feel and (b) the transmission of the road surface input individually adjustable. The detailed configuration of the above is described in the following.

Control structure of the reaction force motor 58 and the tire turning motor 78 by the control section 60 is described with reference to FIGS. 2 to 4. A suffix "r" is added to the symbol of the parameter related to the reaction force motor 58 and a suffix "t" is added to the symbol of the parameter related to the tire turning motor 78 for the distinction therebetween. The reaction force motor 58 and the tire turning motor 78 are respectively controlled by using the operation information of the other motor in addition to their own feedback information. That is, a torque Tt or a current It of the tire turning motor 78 is used to control the reaction force motor 58, and a rotation angle θr of the reaction force motor 58 is used to control the tire turning motor 78.

Figure 2:
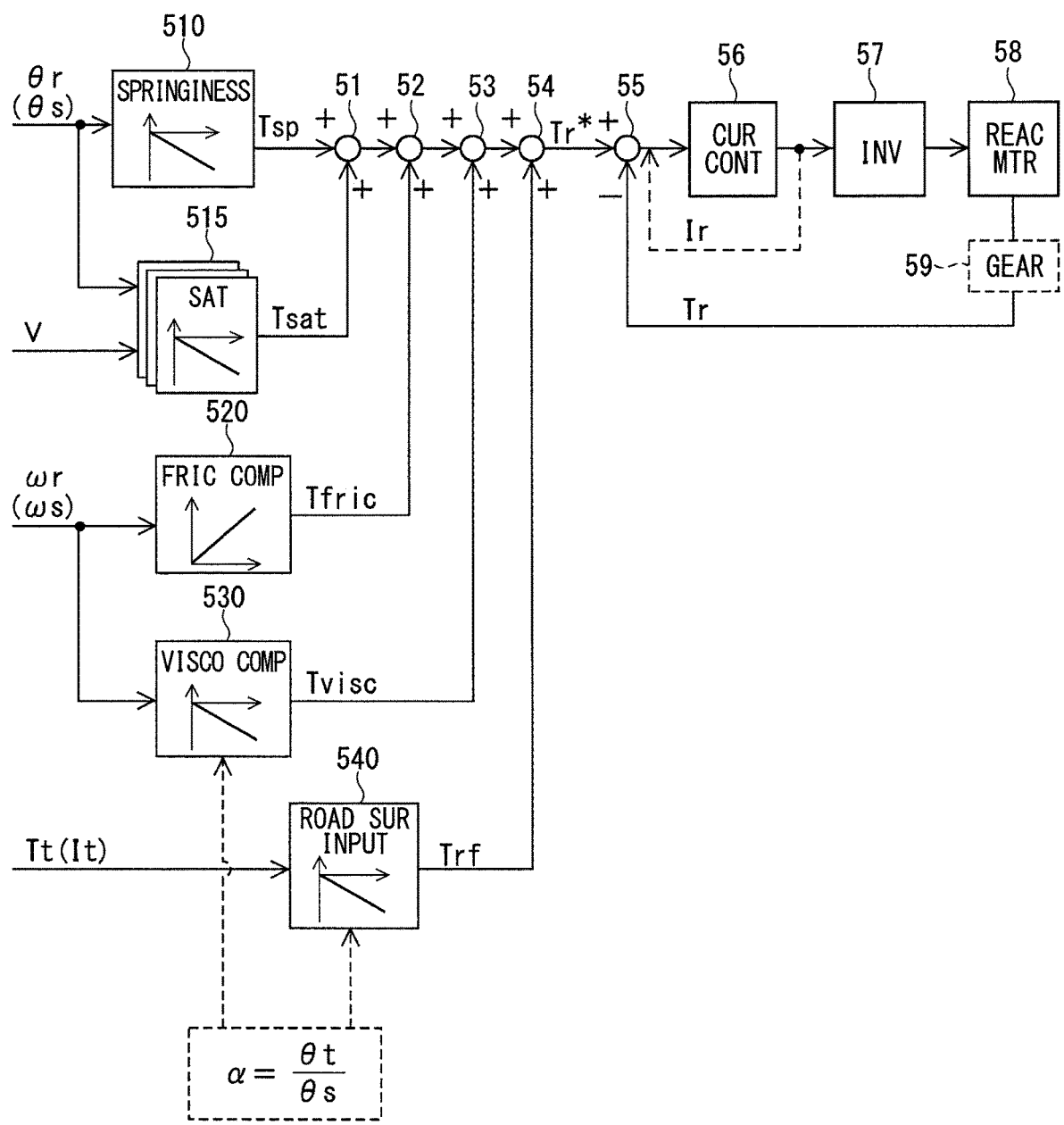
FIG. 2 is a control block diagram of a reaction force motor.

FIG. 2 shows a control block diagram of the reaction force motor 58. The reaction force motor 58 of the present embodiment may be a polyphase alternating current (AC) motor driven by receiving a supply of an AC power from an inverter 57. The rotation of the reaction force motor 58 is decelerated via a gear 59, transmitted to the steering shaft 92, and added to the steering torque. The reaction force motor rotation angle θr, a rotation angular velocity ωr, and the torque Tr in FIG. 2 and other drawings are the values after conversion of multiplying a gear ratio of the gear 59, respectively. In addition, the reaction force motor rotation angle θr and the rotation angular velocity ωr are correlation values of the steering angle θs and a steering speed ωs, and can be replaceable with the steering angle θs and the steering speed ωs, as appropriate.

In the control system of FIG. 2, the actual torque Tr of the reaction force motor 58 is feedback-controlled with respect to a torque instruction value Tr*. The torque instruction value Tr* is calculated as an addition (i.e., sum total) of a springiness component Tsp, an SAT component Tsat, a friction compensation amount Tfric, and a viscosity compensation amount Tvisc, in addition to a reaction force amount Trf due to the road surface input, which are added by adders 51, 52, 53, and 54.

Each term of the torque instruction value Tr* is calculated by map computation or the like in each of computing sections 510, 515, 520, 530 and 540. The maps shown in FIG. 2 are illustration of correlation between input and output simplified either as a positive correlation or a negative correlation, which may further be defined in detail as appropriate. For example, two maps may be switched between a steer-away (i.e., an operation turning the steering wheel 91 away from a neutral position) and a steer-back (i.e., an operation returning the steering wheel 91 back to the neutral position).

The springiness component calculation unit 510 calculates the springiness component Tsp based on the reaction force motor rotation angle θr. The SAT component calculation unit 515 calculates a self-aligning torque (SAT) component Tsat based on the reaction force motor rotation angle θr and a vehicle speed V. The springiness component Tsp and the SAT component Tsat are input to the adder 51.

The friction compensation amount calculation unit 520 calculates the friction compensation amount Tfric based on the reaction force motor rotational angular velocity ωr. The friction compensation amount Tfric has a positive correlation with respect to the reaction force motor rotational angular velocity ωr or the steering speed ωs. The viscosity compensation amount calculation unit 530 calculates the viscosity compensation amount Tvisc that gives a viscous feel to the steering operation of the driver based on the reaction force motor rotational angular velocity ωr. The viscosity compensation amount Tvisc has a negative correlation with respect to the reaction force motor rotational angular velocity ωr or the steering speed ωs. The friction compensation amount Tfric and the viscosity compensation amount Tvisc are input to the adders 52 and 53, respectively.

The reaction force amount calculation unit 540 calculates the reaction force amount Trf based on the road surface information calculated from the torque Tt or the current It of the tire turning motor 78, that is, the output of the tire turning motor 78. The reaction force amount Trf has a negative correlation with the torque Tt or the current It of the tire turning motor 78. The reaction force amount Trf is input to the adder 54. The terms input to the adders 51, 52, 53, and 54 are summed in such manner, and the torque instruction value Tr* is calculated.

A torque subtractor 55 calculates a torque deviation between the torque instruction value Tr* and the actual torque Tr of the reaction force motor 58. A current control section 56 calculates an output current Ir so that the actual torque Tr follows the torque instruction value Tr*, and outputs the output current Ir to the inverter 57. Here, instead of performing a feedback control of the torque of the reaction force motor 58, the output current of the current control section 56 may be feedback-controlled as indicated by a broken line in FIG. 2.

Figure 3A:
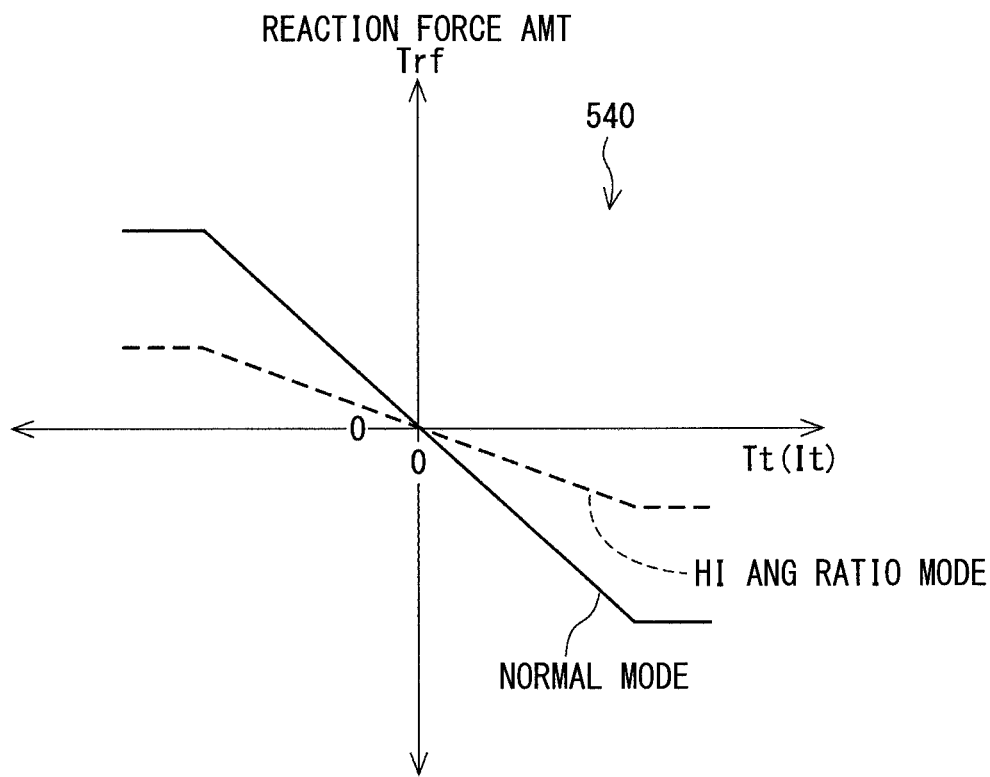
FIG. 3A is a map of a reaction force amount and FIG. 3B is a map of a viscosity compensation amount.
Figure 3B:
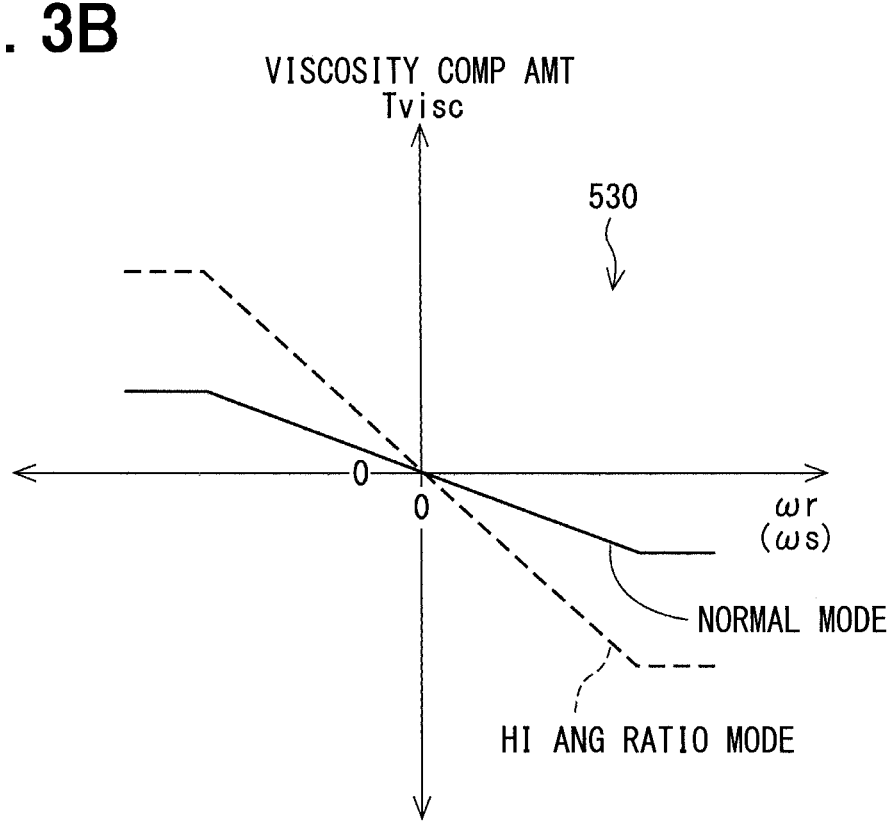

Next, with reference to FIGS. 3A and 3B, the control related to the steer angle ratio change process is described. In the present embodiment, the reaction force amount Trf and the viscosity compensation amount Tvisc are changed, i.e., increased or decreased, while changing the steer angle ratio $\alpha$ $(=(\theta t/\theta s))$, in a later-described steer angle ratio change process. As described above, the reaction force amount Trf is a torque component proportional to the torque Tt or the current It of the tire turning motor 78 with a negative proportionality constant. Further, the viscosity compensation amount Tvisc is a torque component, which is proportional to the reaction force motor rotational angular velocity $\omega r$ or the steering speed $\omega s$ with a negative proportionality constant.

In the map of the reaction force amount calculation unit 540 shown in FIG. 3A, an absolute value of the negative slope of the straight line of the reaction force Trf with respect to the output of the tire turning motor 78 is referred to as "the absolute value of the map slope." In the normal mode where the steer angle ratio $\alpha$ is relatively small, the reaction force amount calculation unit 540 sets the absolute value of the map slope to a relatively high value, and, in the high angle ratio mode where the steer angle ratio $\alpha$ is relatively high, the absolute value of the map slope is set as a relatively small value. Therefore, when the output of the tire turning motor 78 is constant, in the high angle ratio mode, the absolute value of the reaction force Trf becomes smaller than in the normal mode. In such a manner, in the high angle ratio mode, the control of the steering wheel is made harder to be taken over by the road surface input.

In the map of the viscosity compensation amount calculation unit 530 shown in FIG. 3B, an absolute value of the negative slope of the straight line of the viscosity compensation amount Tvisc with respect to the reaction force motor rotational angular velocity $\omega r$ or the steering velocity $\omega s$ is referred to as "the absolute value of the map slope." In the normal mode in which the steer angle ratio $\alpha$ is relatively small, the reaction force amount calculation unit 540 sets the absolute value of the map slope to a relatively small value, and, in the high angle ratio mode where the steer angle ratio $\alpha$ is relatively high, the absolute value of the map slope is set to a relatively large value. Therefore, when the steering speed $\omega s$ is constant, in the high angle ratio mode, the absolute value of the viscosity compensation amount Tvisc becomes larger than in the normal mode. In such a manner, vibration of the steering wheel caused by the driver's input (i.e., during the steering operation of the driver) in the high angle ratio mode is reduced.

Figure 4:
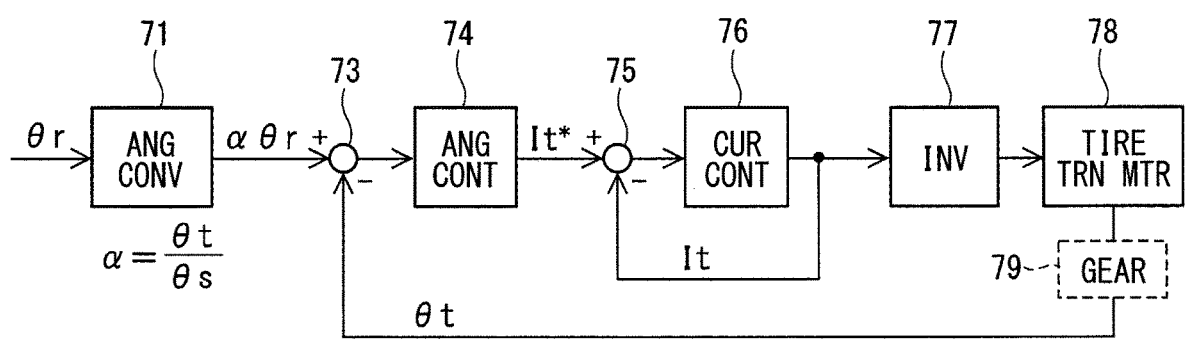
FIG. 4 is a control block diagram of a tire turning motor.

FIG. 4 shows a control block diagram of the tire turning motor 78. The tire turning motor 78 of the present embodiment is a polyphase AC motor driven by receiving a supply of AC power from an inverter 77 in the same manner as the reaction force motor 58. The rotation of the tire turning motor 78 is decelerated via the gear 79 and transmitted to the tire 99. The control system of the tire turning motor 78 is constituted by a double loop among which an outer loop controls the tire turning angle $\theta t$ and an inner loop controls the current It of the tire turning motor.

The reaction force motor rotation angle $\theta r$ after the gear ratio conversion is input to a control system of the tire turning motor 78. An angle conversion unit 71 calculates a conversion value $\alpha\theta r$ obtained by multiplying the input reaction force motor rotation angle $\theta r$ by the steer angle ratio $\alpha$ $(=(\theta t/\theta s))$. Therefore, when the steer angle ratio $\alpha$ is changed, the converted value $\alpha\theta r$ changes. Further, an actual value of the tire turning angle $\theta t$ is fed back as a value obtained by multiplying the rotation angle of the tire turning motor 78 by the gear ratio of the gear 79.

An angle subtractor 73 calculates an angular deviation between the converted value $\alpha\theta r$ of the reaction force motor rotation angle and the tire turning angle $\theta t$. An angle control section 74 calculates the current instruction value It* so that the angle deviation calculated by the angle subtractor 73 approaches zero. A current subtractor 75 calculates a current deviation between the current instruction value It* and the output current It fed back by a current control section 76. The current control section 76 calculates the output current It so that the output current It follows the instruction value It*, and outputs the output current It to the inverter 77.

Figure 5:
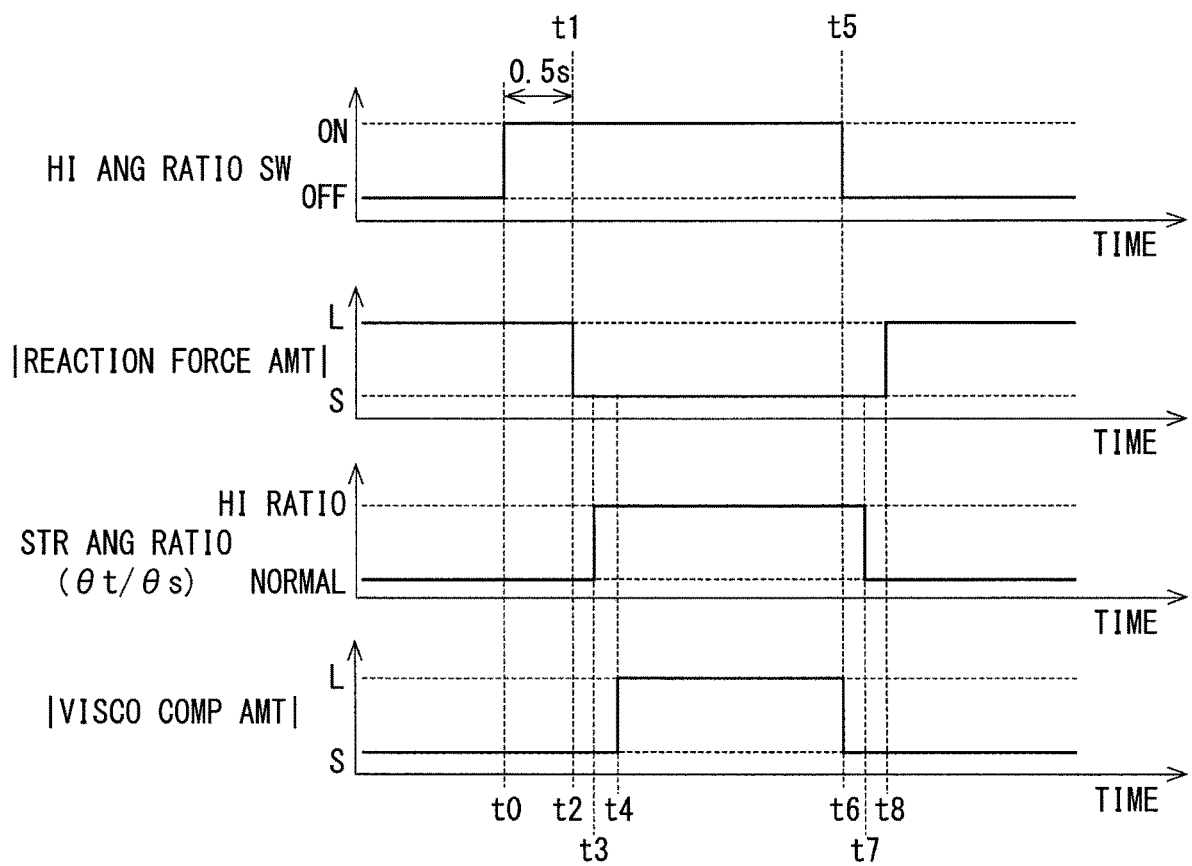
FIG. 5 is a time chart of a steer angle ratio change process according to the first embodiment.

The steer angle ratio change process according to the first embodiment is described with reference to the time chart of FIG. 5 and the flowcharts of FIGS. 6 to 8. FIG. 5 shows chronological changes of the following, i.e., an ON/OFF of the high angle ratio switch 61, the absolute value of the reaction force amount, the steer angle ratio, and the absolute value of the viscosity compensation amount from the top row of FIG. 5 in order. Each of those values changes as binary values (i.e., one of two values such as ON/OFF, Large/Small, and High ratio value/Reference value), based on an assumption that the drive conditions other than the switch ON/OFF are constant. That is, it is assumed that the conditions such as the rotation acceleration $\omega r$, the torque Tt or the current It of the tire turning motor 78 and the like in FIG. 3 are constant.

Figure 11:
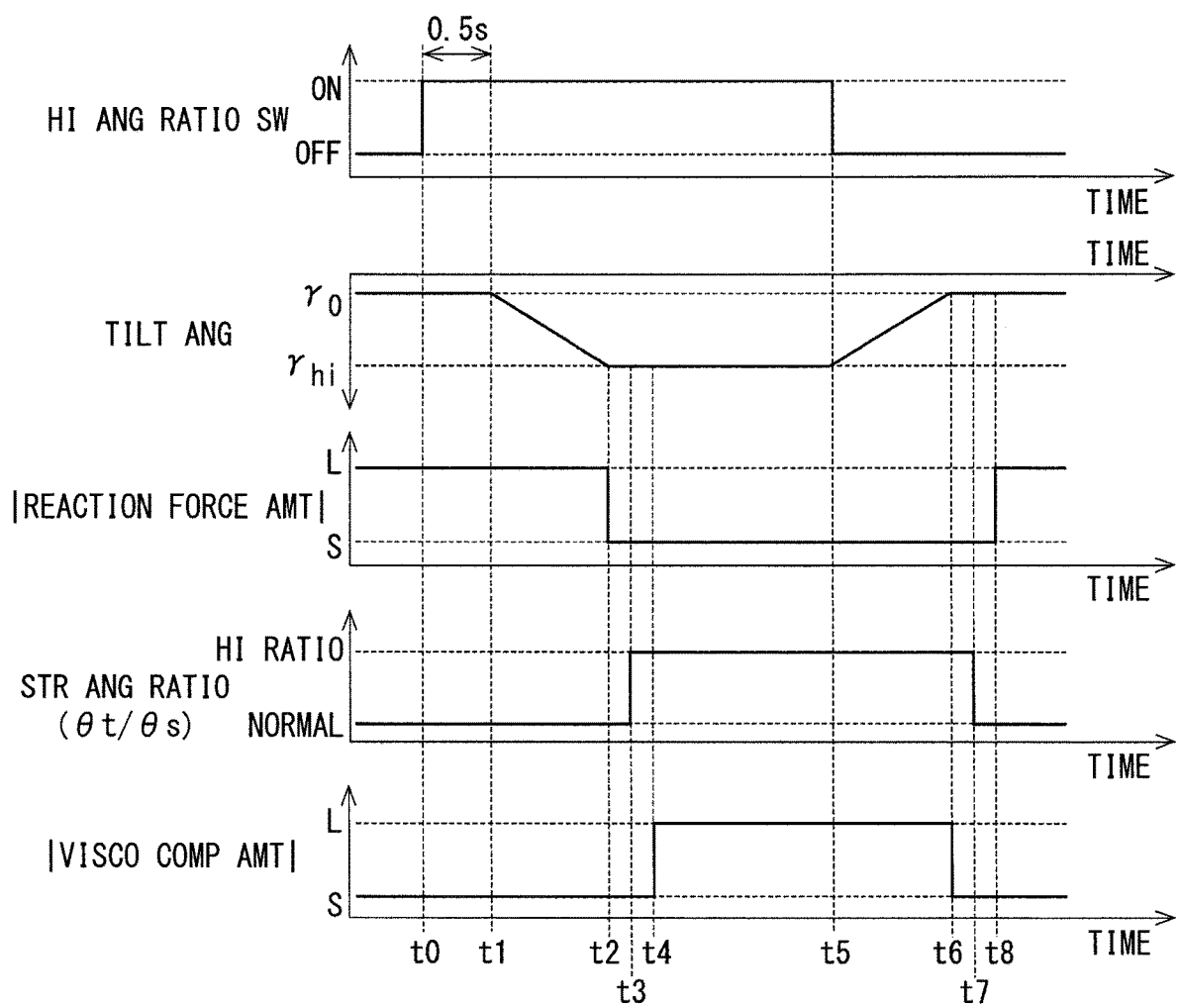
FIG. 11 is a time chart of the steer angle ratio change process according to the second embodiment.
Figure 15:
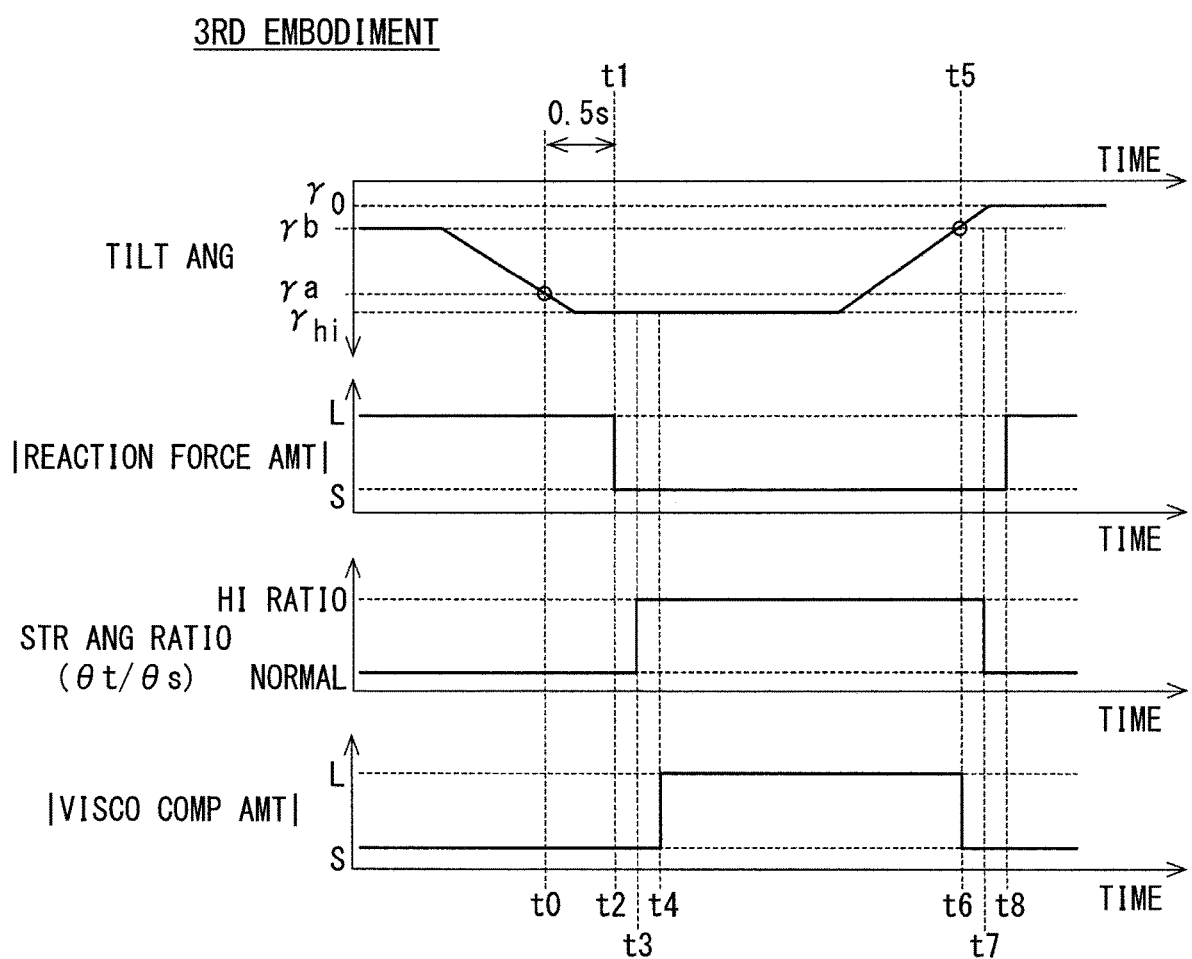
FIG. 15 is a time chart of the steer angle ratio change process according to the third embodiment.

Symbols of time t0 to time t8 of the time chart in FIG. 5 are used in common with FIG. 11 of the second embodiment and FIG. 15 of the third embodiment. In the first embodiment, time t1 overlaps time t2, and time t5 overlaps time t6. However, strictly speaking, there is a possibility that a delay is caused with respect to time t2 against time t1, and with respect to time t6 against time t5, due to the operation detection time of the switch 61 and/or due to the communication time.

In the initial state before time t0, the high angle ratio switch 61 is OFF, and the steer angle ratio is the reference value. At time t2, which is substantially the same as time t1 after a predetermined time (e.g., 0.5 s) since the high angle ratio switch 61 is turned ON at time t0, the control section 60 starts the process of transitioning to the high angle ratio mode. The control section 60 first changes the absolute value of the reaction force amount to a small value at time t2, and then changes the steer angle ratio to the value of the high angle ratio at time t3 and then increases the absolute value of the viscosity compensation amount at time t4. The time difference between times t2, t3, and t4 may have the minimum value, as long as not causing inversion of order among t2, t3 and t4 due to variations in response time or the like.

The order of processing (e.g., at times t2, t3, t4) is set based on (i.e., in consideration of) the following three priority aspects, i.e., (i) "a driver-intended abrupt steering operation not hindered," (ii) "a driver's control of the steering wheel not to be taken over by the road surface input," and (iii) "vibration of the steering wheel reduced in the high angle ratio mode." That is, in other words, after changing the steer angle ratio to a high value, the viscosity is increased for preventing disturbance/hindrance to the abrupt steering operation by the driver. Further, after decreasing the absolute value of the reaction force amount, the steer angle ratio is increased to a high value for preventing the driver's control of the steering wheel from being taken over by the road surface input.

Next, when the high angle ratio switch 61 is turned OFF at time t5 in the high angle ratio mode, the control section 60 starts the process of transitioning to the normal mode at time t6 which is substantially the same as time t5. Contrary to the transition to the high angle ratio mode, the control section 60 first changes the absolute value of the viscosity compensation amount to a small value at time t6, then changes the steer angle ratio to the reference value at time t7, and then the absolute value of the reaction force amount is changed, i.e., increased, at time t8. The time difference between times t6, t7, and t8 may have the minimum value, as long as not causing inversion of order among t6, t7, t8 due to variations in response time or the like.

In the following flowcharts of FIG. 6 and thereafter, a symbol "S" indicates a step. For the convenience of description of steps having the same contents and the same step numbers, there may be a missing number in step numbering. FIGS. 7 and 8 are sub-flowcharts corresponding to S19 and S29 of FIG. 6, respectively.

Figure 6:
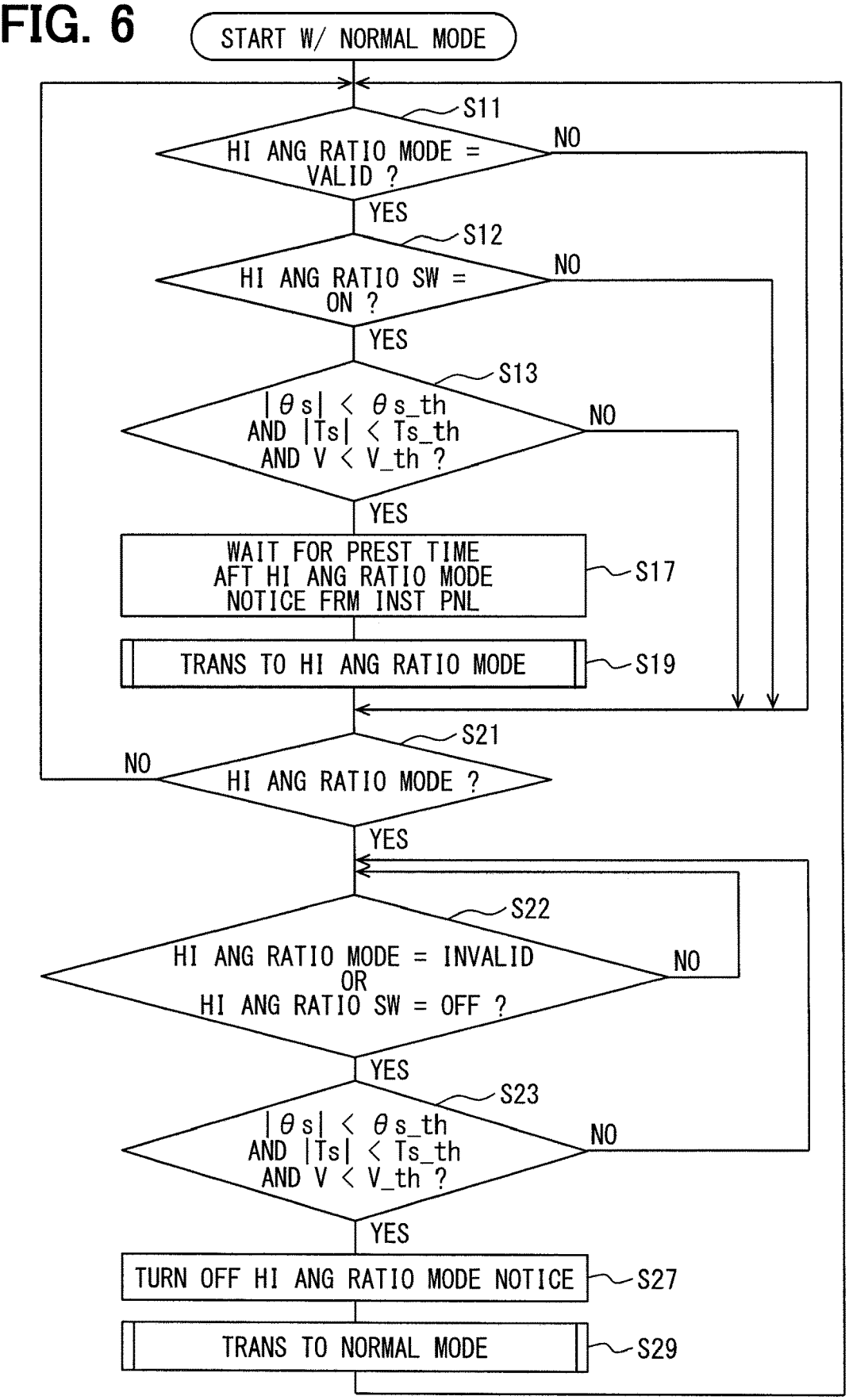
FIG. 6 is a flowchart of the steer angle ratio change process according to the first embodiment.

In the flowchart of FIG. 6, an initial steer angle ratio at the time of starting the vehicle is the reference value. That is, the initial steer angle ratio mode is the normal mode. In the first half of process, i.e., at S11 to S19, the steer angle ratio change process for a mode change from the normal mode to the high angle ratio mode is performed, and, in the second half, i.e., at S21 to S29, the steer angle ratio change process for a mode change from the high angle ratio mode to the normal mode is performed.

At S11 performed in the normal mode, it is determined whether the high angle ratio mode is valid. When the high angle ratio mode is invalid and it is determined as NO at S11, the process proceeds to S21. When the high angle ratio mode is valid and it is determined as YES at S11, it is then determined at S12 whether the high angle ratio switch 61 is in the ON state. When the high angle ratio switch 61 is OFF and NO is determined at S12, the process proceeds to S21.

At S13, it is determined whether an AND condition of the following three items is satisfied with respect to the drive condition. If all three items are YES, a determination of YES is made at S13, and the control section 60 permits the change of the steer angle ratio mode. On the other hand, if any one of the three items is NO, NO is determined at S13, and the control section 60 prohibits the change of the steer angle ratio mode. If NO is determined at S13, the process proceeds to S21.

Here, the steering angle θs and the steering torque Ts are defined such that, for example, the left rotation direction is positive and the right rotation direction is negative according to the rotation direction of the steering wheel 91 with respect to the neutral position. Since there is basically no difference in characteristics among the rotation directions of left and right, absolute values of the angle and the torque are compared with respective determination threshold values, regarding both of the rotation directions of left and right.

<Condition 1> The absolute value |θs| of the steering angle is less than a steering angle threshold value θs_th (e.g., 10 deg). In other words, when the vehicle is traveling substantially straight, the control section 60 permits the change of the steer angle ratio mode. On the other hand, when the absolute value |θs| of the steering angle is equal to or greater than the steering angle threshold value θs_th, the control section 60 prohibits the change of the steer angle ratio mode, since the steering operation may be destabilized if the steer angle ratio is changed during the turning of the vehicle. Note that, in place of the absolute value |θs| of the steering angle, the absolute value |θt| of the tire turning angle may be compared with a tire turning angle threshold value.

<Condition 2> The absolute value |Ts| of the steering torque is less than a torque threshold value Ts_th (e.g., 5 [Nm]). In other words, when the driver is not substantially performing a steering operation, the control section 60 permits the change of the steer angle ratio mode. On the other hand, when the absolute value |Ts| of the steering torque is equal to or greater than the steering torque threshold value Ts_th, the control section 60 prohibits the change of the steer angle ratio mode, since the steering operation may be destabilized if the steer angle ratio is changed when the driver is performing a steering operation by a relatively high torque.

<Condition 3> The vehicle speed V is less than a vehicle speed threshold value V_th (e.g., 30 [km/h]). In other words, during a low-speed travel, the control section 60 permits the change of the steer angle ratio mode. On the other hand, when the vehicle speed V is higher than the vehicle speed threshold value V_th, the control section 60 prohibits the change of the steer angle ratio mode.

If YES is determined at S13, i.e., at a steer angle ratio change permission/prohibition determination step, the control section 60 gives notice to the driver of the transition to the high angle ratio mode at S17 via a meter display or the like of an instrument panel, and waits for a predetermined time (e.g., 0.5 sec). Thereafter, the control section 60 transitions to the high angle ratio mode at S19. As shown in FIG. 7, when transitioning from the normal mode to the high angle ratio mode, the control section 60 first changes the absolute value of the reaction force amount to a small value at S191, then, the control section 60 changes the steer angle ratio to a value of the high angle ratio mode at S192. Thereafter, the absolute value of the viscosity compensation amount is changed to a greater value at S193.

Subsequently, at S21, it is determined whether or not the steer angle ratio mode is currently in the high angle ratio mode. If YES is determined at S21, the process proceeds to S22, and, if NO is determined at S21, the process returns to S11. At S22, it is determined whether the high angle ratio mode is invalid or the high angle ratio switch 61 is OFF. If YES is determined at S22, the process proceeds to S23, and, if NO is determined at S22, the determination at S22 is repeated. At S23, it is determined whether or not the steer angle ratio mode is changeable on the basis of the AND condition of the same three items as S13. If NO is determined at S23, the process returns to S22.

If YES is determined at S23, the control section 60 turns OFF the notice of the high angle ratio mode via the aforementioned meter etc. at S27, transitions to the normal mode at S29, and returns to S11. That is, when returning to the normal mode, the standby process after the notice is omitted. As shown in FIG. 8, when transitioning from the high angle ratio mode to the normal mode, the control section 60 firstly changes the absolute value of the viscosity compensation amount to a small value at S291, then changes the steer angle ratio to the reference value at S292, and then, the absolute value of the reaction force amount is changed to a greater value at S293.

When transitioning from the normal mode to the high angle ratio mode, the control section 60 decreases the absolute value of the reaction force amount, and increases the absolute value of the viscosity compensation amount. That is, the control section 60 decreases the absolute value of the reaction force amount to be sensed by (i.e., to be fed back to) the driver, and prevents the control of the steering wheel from being taken over by the input from the road surface. At the same time, by increasing the absolute value of the viscosity compensation amount, the control section can reduce or prevent the vibration of the steering wheel caused by the driver's input (i.e., during the steering operation of the driver) even when the steer angle ratio is high. Further, when transitioning from the high angle ratio mode to the normal mode, the control section 60 increases the absolute value of the reaction force amount, and decreases the absolute value of the viscosity compensation amount to a small value. In such a manner, returning to the normal mode is properly performable.

Figure 7:
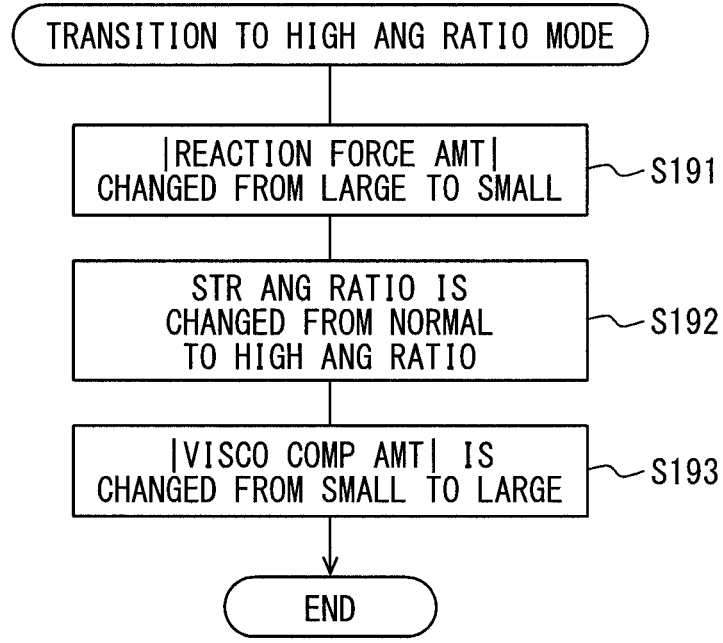
FIG. 7 is a sub-flow chart of a step of transitioning to a high angle ratio mode.
Figure 8:
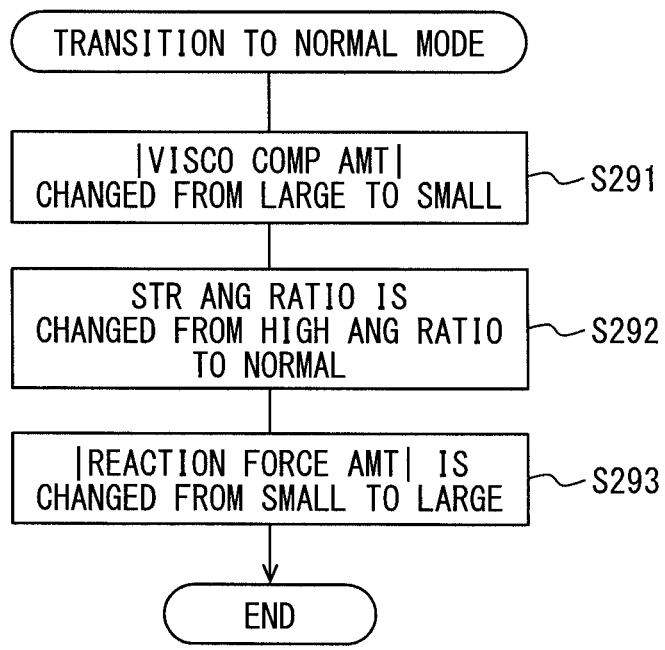
FIG. 8 is a sub-flowchart of a step of transitioning to a normal mode.
Figure 9:
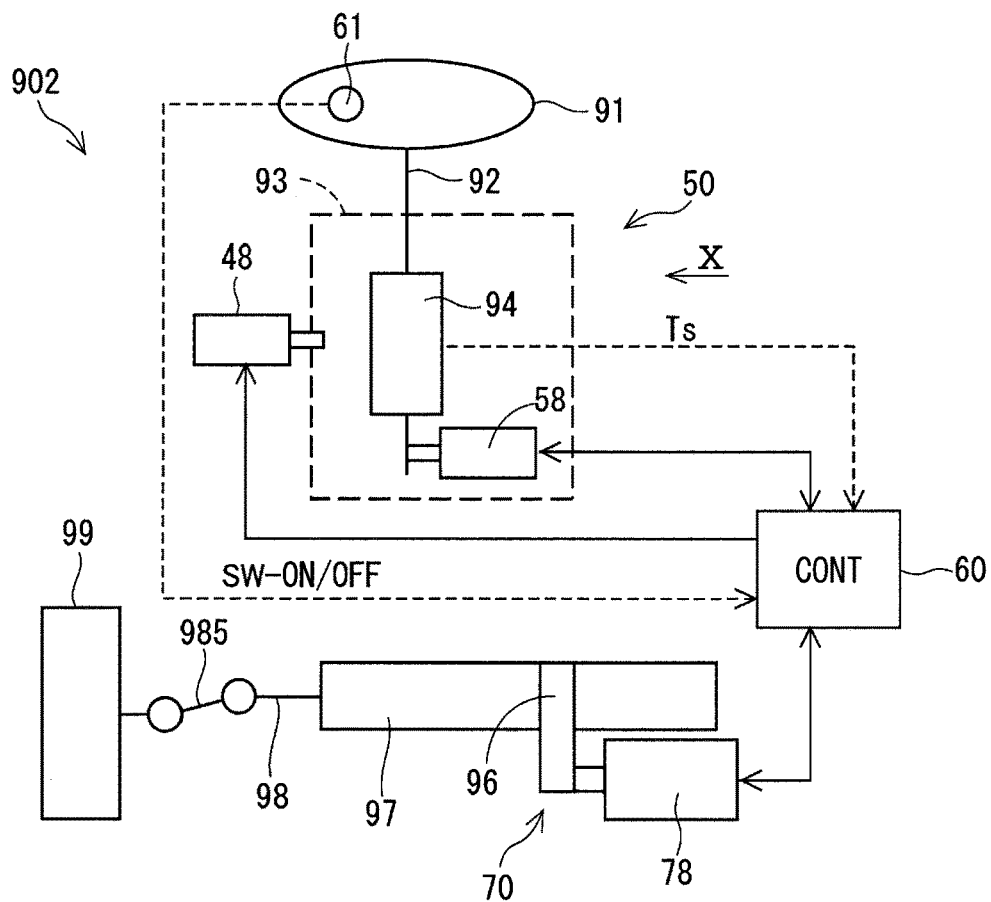
FIG. 9 is a configuration diagram of the steer-by-wire system to which the steering controller according to a second embodiment is applied.

Specifically, when transitioning from the normal mode to the high angle ratio mode, the control section 60 changes the steer angle ratio to a high value after decreasing the absolute value of the reaction force amount, and then increases the absolute value of the viscosity compensation amount (i.e., t2→t3→t4 in FIG. 5 and flow in FIG. 7). In such a manner the steer angle ratio is changeable to a high value without hindering the abrupt steering operation intended by the driver, and while preventing a driver's control of the steering wheel from being taken over by the input from the road surface. Further, when transitioning from the high angle ratio mode to the normal mode, the control section 60 decreases the steer angle ratio after decreasing the absolute value of the viscosity compensation amount, and then increases the absolute value of the reaction force amount (i.e., t6→t7→t8 in FIG. 5 and flow in FIG. 8). In such a manner, returning to the normal mode is properly performable.

Further, when the vehicle is not traveling straight or when the vehicle speed V is higher than the vehicle speed threshold value V_th, the control section 60 prohibits the change of the steer angle ratio mode irrespective of ON/OFF of the switch 61. In such a manner, destabilization of the steering operation is prevented when changing the steer angle ratio mode.

In addition, in the first embodiment, the high angle ratio switch 61 is provided on the steering wheel 91 as the "input device." By using the switch 61 dedicated to the change of the steer angle ratio mode, the driver's confusion of the switch 61 with other switch(es) is prevented, for proper and appropriate operation of the switch 61 by the driver.

Second Embodiment

Figure 10:
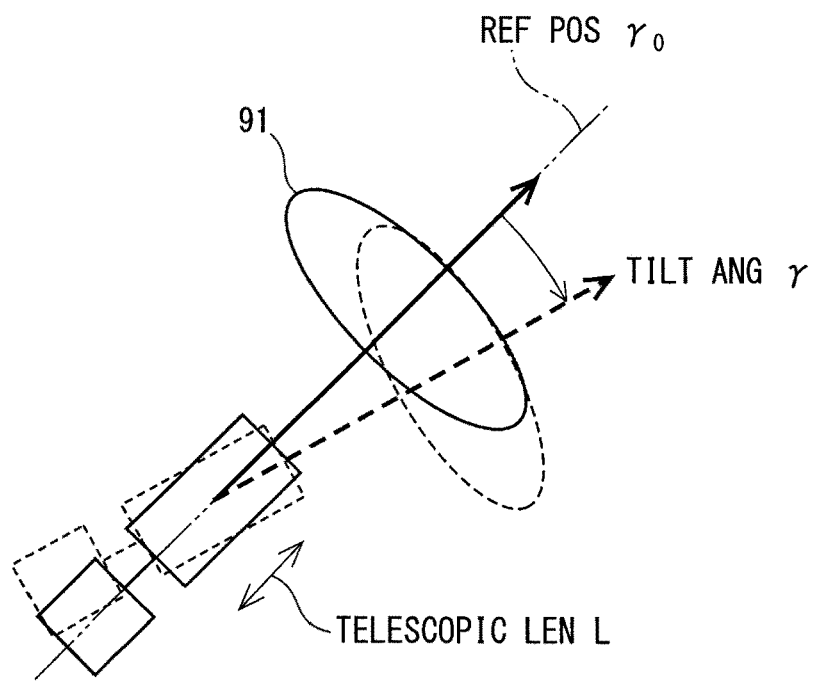
FIG. 10 is an illustration of a side view of a steering wheel part in an X direction taken from FIGS. 9 and 13.

The second embodiment of the present disclosure is described with reference to FIG. 9 to FIG. 12. In the steering controller of the second embodiment applied to a steer-by-wire system 902 of FIG. 9, a tilt actuator 48 for adjusting a tilt angle of the steering wheel 91 is provided on a steering column 93. As shown in FIG. 10, the steering wheel 91 is provided with a tilt angle $\gamma$, i.e., the position of the steering wheel 91 (i.e., an angle of the steering column) is variable in the up-and-down direction by the operation of the tilt actuator 48 from a reference position $\gamma_0$ in the initial state. In the second embodiment, when changing the steer angle ratio mode, the tilt angle $\gamma$ is changed by the tilt actuator 48 for giving notice to the driver of such a change of the steer angle ratio mode.

The steer angle ratio change process according to the second embodiment is described with reference to the time chart of FIG. 11 and the flowchart of FIG. 12. In contrast to FIG. 5 which is a time chart of the first embodiment, a diagram of the tilt angle $\gamma$ is added to the time chart of FIG. 11. In the tilt angle diagram, the lower the tilt angle $\gamma$ becomes relative to the reference position $\gamma_0$, the lower the diagram line goes (i.e., note that the vertical axis of the second row of FIG. 11 points downward). Further, in the flowchart of FIGS. 12, S18 and S28 are added to FIG. 6 of the first embodiment.

At time t1 of FIG. 11, which is after a predetermined time (e.g., 0.5 sec) from turning ON of the high angle ratio switch 61 at time t0, the control section 60 drives the tilt actuator 48, to start to change, i.e., lower, the tilt angle $\gamma$ from the reference position $\gamma_0$. This step is shown as S18 in FIG. 12. When the tilt angle $\gamma$ reaches a value $\gamma_{hi}$ corresponding to the high angle ratio mode at time t2, the transition from the normal mode to the high angle ratio mode is performed as in the first embodiment.

When the high angle ratio switch 61 is turned OFF at time t5, the control section 60 drives the tilt actuator 48 to start to change the tilt angle $\gamma$ in a direction to return to the reference position $\gamma_0$. This step is shown as S28 in FIG. 12. When the tilt angle $\gamma$ reaches the reference position $\gamma_0$ at time t6, the transition from the high angle ratio mode to the normal mode is performed, just like the first embodiment.

As described above, in the second embodiment, after the switch 61 is operated by the driver, immediately before changing the steer angle ratio mode, the control section 60 changes the tilt angle $\gamma$ and gives notice of the mode change to the driver. Therefore, the driver can more surely recognize that the steer angle ratio mode is changed from the feeling of the hand gripping the steering wheel 91, in addition to the visual information from the meter.

Third Embodiment

The third embodiment of the present disclosure is described with reference to FIG. 13 to FIG. 16. Regarding the side view of the steering wheel part of FIG. 13, FIG. 10 of the second embodiment may be employable. The steering controller of the third embodiment applied to a steer-by-wire system 903 in FIG. 13 does not have the high angle ratio switch 61 as the "input device." Instead, when the driver changes the tilt angle $\gamma$ of the steering wheel 91, the steering wheel 91 functions as an "input device."

It is assumed that the steering wheel 91 is at the highest reference position $\gamma_0$ in the initial state, and the tilt angle $\gamma$ is positive in the direction of lowering the steering wheel 91 from the reference position $\gamma_0$. The tilt actuator 48 is constituted by, for example, a motor, and outputs a torque to raise and lower the steering wheel 91. When the output torque of the tilt actuator 48 is relatively large, the driver cannot raise and lower the steering wheel 91 with his/her own force, i.e., cannot arbitrarily change the tilt angle $\gamma$. On the other hand, when the output torque of the tilt actuator 48 is relatively small, the driver can arbitrarily change the tilt angle $\gamma$ with his/her own force, and the steer angle ratio mode is switchable with such input of tilt angle change (i.e., raising/lowering operation of the tilt angle).

Figure 14:
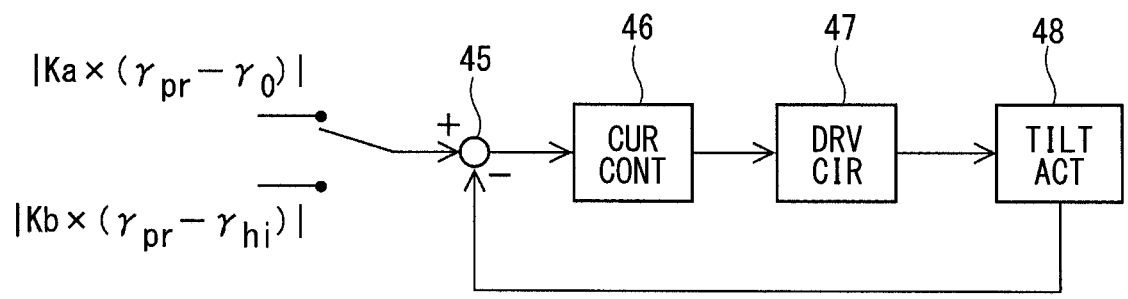
FIG. 14 is a control block diagram of a tilt actuator.

FIG. 14 shows a schematic control block diagram of the tilt actuator 48. The tilt actuator 48 is controlled by feedback control of control parameters. The parameter to be fed back may be torque or electric current. A subtractor 45 calculates the deviation between the target value and the actual value of the torque or the electric current. A current controller 46 performs current control so that the deviation calculated by the subtractor 45 approaches zero, and outputs a drive signal to a drive circuit 47.

Here, the operation of lowering the steering wheel 91 from the reference position $\gamma_0$ is referred to as an "advance operation," and the operation of raising the steering wheel 91 to return to the reference position $\gamma_0$ is referred to as a "return operation." When the change of the steer angle ratio mode is permitted, the control section 60 switches from the normal mode to the high angle ratio mode upon having an input of the advance operation, and switches from the high angle ratio mode to the normal mode upon having an input of the return operation.

A current tilt angle is designated as $\gamma_{pr}$, a tilt angle of the reference position corresponding to the normal mode is designated as $\gamma_0$, and a tilt angle corresponding to the high angle ratio mode is designated as $\gamma_{hi}$, respectively in the following. Further, when a tilt torque constant in the advance operation is Ka and a tilt torque constant in the return operation is Kb, the target value of the feedback control is calculated by an equation (1) in the advance operation and by an equation (2) in the return operation. The target value calculated by one of the two equations is input to the subtractor 45 in accordance with the advance operation or the return operation.

$$|Ka \times (\gamma_{pr} - \gamma_0)| \quad (1)$$

$$|Kb \times (\gamma_{pr} - \gamma_{hi})| \quad (2)$$

The steer angle ratio change process according to the third embodiment is described with reference to the time chart of FIG. 15 and the flowchart of FIG. 16. There is no diagram of the high angle ratio switch shown in FIG. 15, which is contrasting to FIG. 11 showing the time chart of the second embodiment including the high angle ratio switch. Further, threshold values γa, γb are shown on the vertical axis of the diagram of the tilt angle γ in FIG. 15. Here, the tilt angle $\gamma_0$ of the reference position is set to 0. The first threshold value γa at the time of the advance operation is set in consideration of the margin and the like based on the tilt angle $\gamma_{hi}$ corresponding to the high angle ratio mode. The second threshold value γb at the time of the return operation is set based on the tilt angle $\gamma_0$ of the reference position. For example, a relation of "0≤γb≤γa" is set such that the first threshold value γa is 15 [deg] and the second threshold value γb is 1 [deg].

The operation of the driver for lowering the steering wheel 91 to set the tilt angle γ to the first threshold value γa or more corresponds to the turning ON operation of the high angle ratio switch 61. Further, the operation of the driver for returning the steering wheel 91 from the lowered state toward the reference position and setting the tilt angle γ to be equal to or less than the second threshold value γb corresponds to the turning OFF operation of the high angle ratio switch 61. As such, in the example of FIG. 15, "γb<γa" is assumed, and hysteresis is set for the switching function of the steer angle ratio mode by changing the tilt angle γ. However, when hunting in the steer angle ratio mode is not a problem, a relation of "γb=γa" may be set.

At time t0 in FIG. 15, the tilt angle γ becomes equal to or greater than the first threshold value γa (i.e., note that the vertical axis of the top row of FIG. 15 points downward), and the transition from the normal mode to the high angle ratio mode is performed during a period from time t2 (i.e., 0.5 second after time t0) to time t4. Further, the tilt angle γ becomes equal to or less than the second threshold value γb at time t5, and the transition from the high angle ratio mode to the normal mode is performed during a period from time t6 to time t8.

Figure 12:
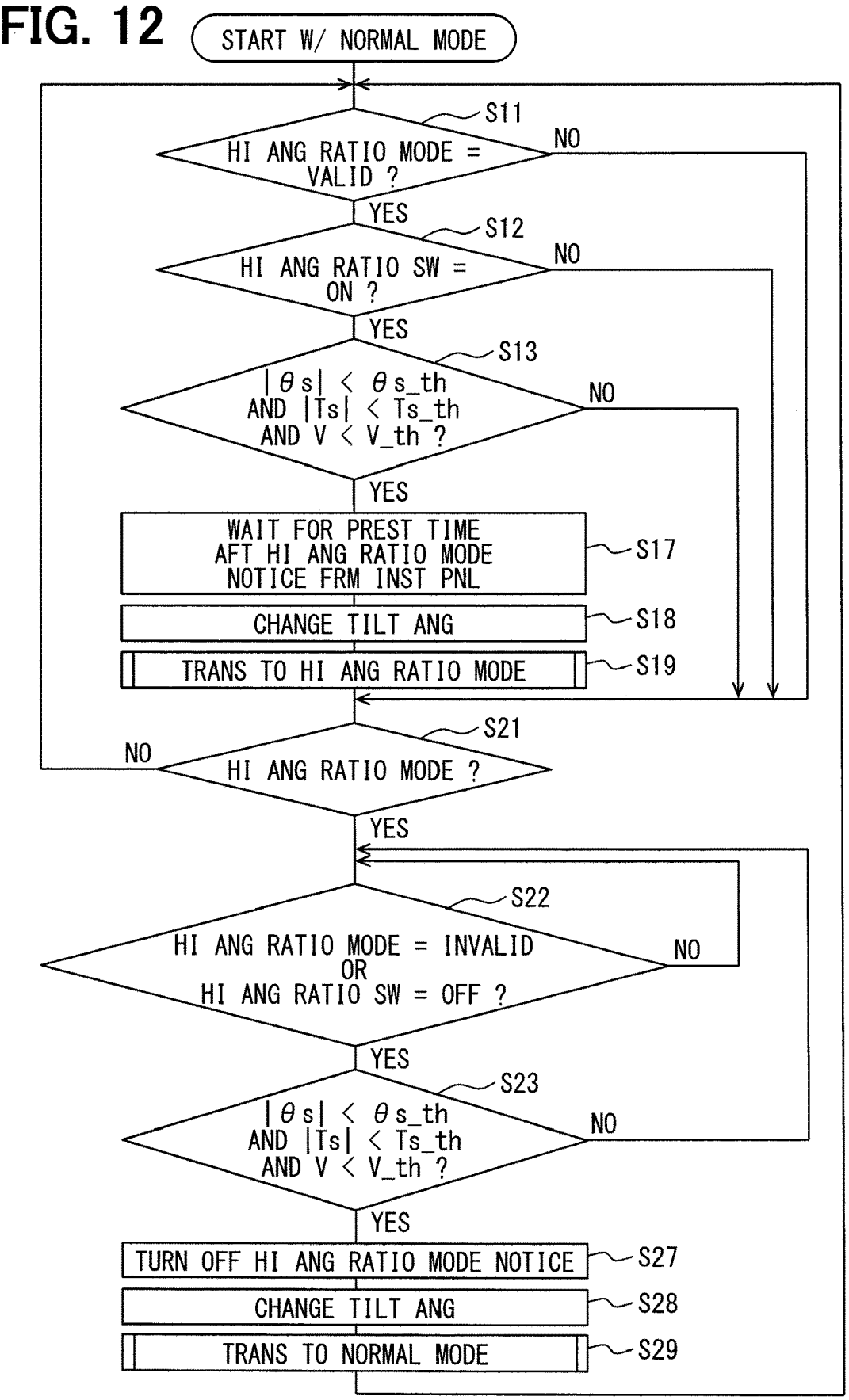
FIG. 12 is a flowchart of the steer angle ratio change process according to the second embodiment.
Figure 13:
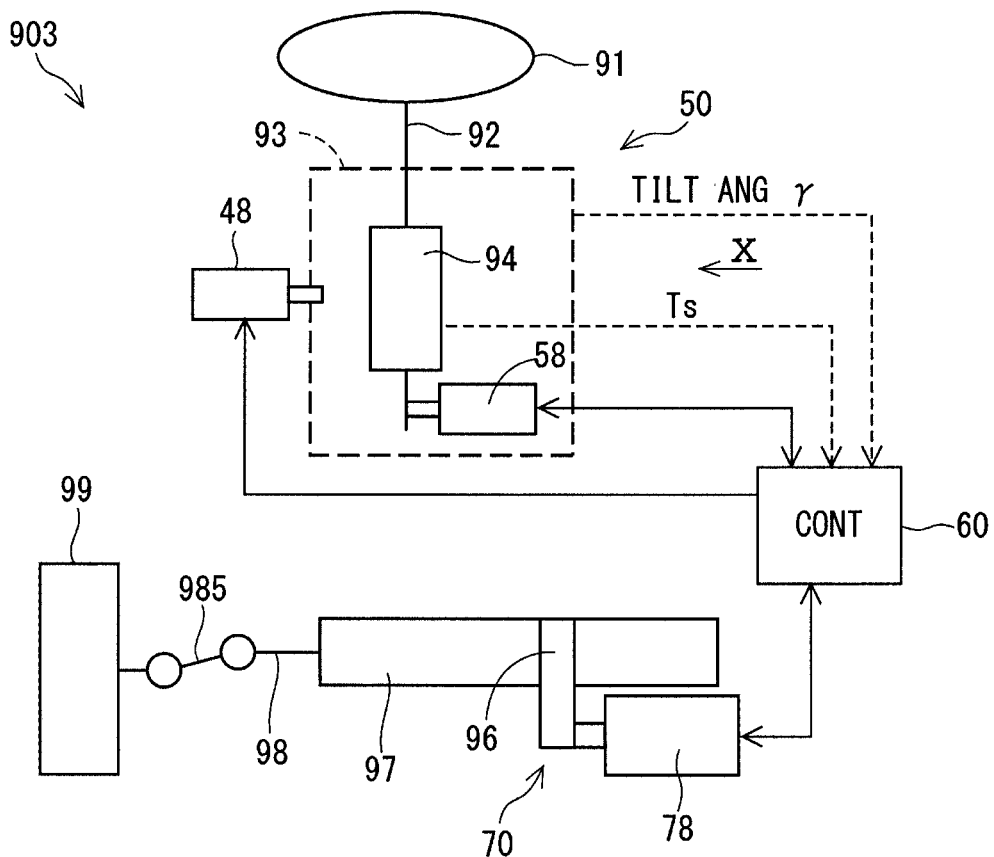
FIG. 13 is a configuration diagram of the steer-by-wire system to which the steering controller according to a third embodiment is applied.
Figure 16:
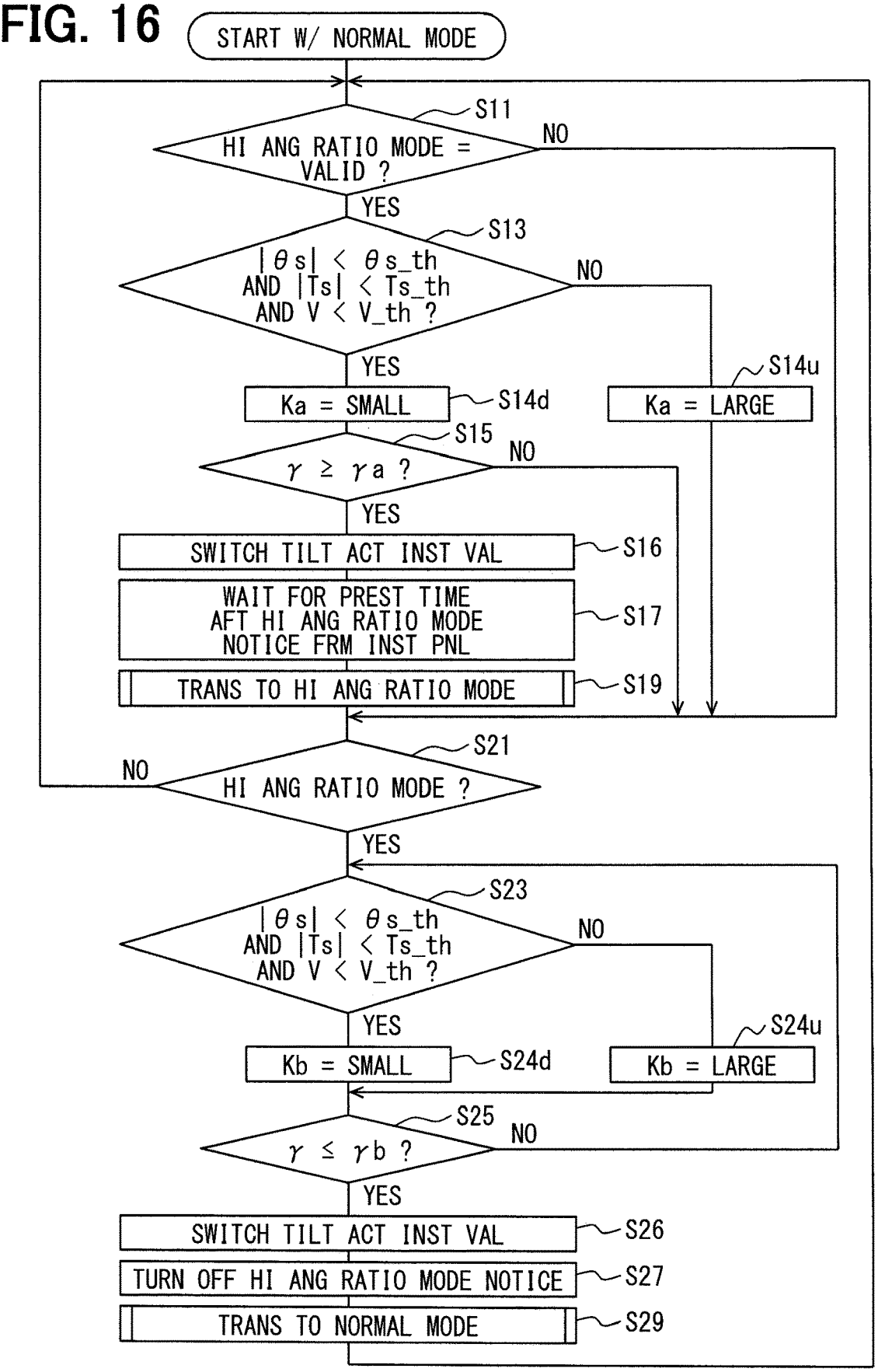
FIG. 16 is a flowchart of the steer angle ratio change process according to the third embodiment.

Note that, the flowchart of FIG. 16 has no S12 and S22 for determining ON/OFF of the high angle ratio switch 61 used in FIGS. 6 and 12 of the first and second embodiments. In the transition from the normal mode to the high angle ratio mode, if YES is determined at S13, that is, if it is determined that the transition is permissible, the control section 60 at 514d sets the tilt torque constant Ka to a small value that allows the driver to change the tilt angle γ by the driver's force. On the other hand, if it is determined as NO at S13, that is, if it is determined that the transition is impermissible, at 514u, the control section 60 sets the tilt torque constant Ka to a large value that does not allow the driver to change the tilt angle γ.

If YES is determined at S13, it is then determined whether the current tilt angle γ is equal to or greater than the first threshold value γa in the advance operation at S15 that is subsequent to 514d. Alternatively, it may be determined whether the advance side change amount of the tilt angle γ is equal to or greater than a change amount threshold value. If YES is determined at S15, the control section 60 determines that there is a transition request to the high angle ratio mode, and switches an instruction of the tilt actuator 48 at S16. At S17, the control section 60 gives notice to the driver of the transition to the high angle ratio mode via the meter or the like on the instrument panel, and waits for a predetermined time (e.g., 0.5 seconds). Thereafter, the control section 60 transitions to the high angle ratio mode at S19.

If NO is determined at S15, the control section 60 determines that there is no transition request to the high angle ratio mode. In such case, since S16 to S19 are skipped and the high angle ratio mode is not set, NO is determined at S21 and the process returns to the beginning of the routine (i.e., to S11).

In the transition from the high angle ratio mode to the normal mode, when YES is determined at S23, that is, when it is determined that the transition is permissible, the control section 60 sets the tilt torque constant Kb to a small value that allows the driver to change the tilt angle γ with his/her force at S24d. On the other hand, when it is determined as NO at S23, that is, when it is determined that the transition is impermissible, the control section 60 sets the tilt torque constant Kb to a large value that does not allow the driver to change the tilt angle γ with his/her force at S24u.

When YES is determined at S23, it is then determined whether the tilt angle γ is equal to or less than the second threshold value γb in the return operation at S25 that is subsequent to S24d. Alternatively, it may be determined whether the amount of the return side change of the tilt angle γ is equal to or greater than the change amount threshold value. When YES is determined at S25, the control section 60 determines that there is a transition request to the normal mode, switches the instruction of the tilt actuator 48 at S26, turns OFF the high angle ratio mode notice via the meter etc. at S27, and transitions to the normal mode at S29. When NO is determined at S25, the control section 60 determines that there is no transition request to the normal mode, and the process returns to S23.

As described above, in the third embodiment, when the driver changes the tilt angle γ, whereby the steering wheel 91 functions as the "input device." Therefore, it is not necessary to provide a dedicated high angle ratio switch 61. Further, the driver can easily recognize the current steer angle ratio mode from the tilt angle γ of the steering wheel 91, just like the second embodiment.

Other Embodiments (A) The installation position of the high angle ratio switch 61 of the first embodiment is not only on the steering wheel 91 as shown in FIG. 1 but also at a position around the paddle shift or around the shift lever. Further, the shift lever may be used as an "input device" and, for example, shifting to a reverse (R) range may be used as an input to the transition to the high angle ratio mode.

(B) The tilt actuator 48 of the second and third embodiments may also have a function as a telescopic actuator for moving the steering wheel 91 back and forth (i.e., to make the steering column 93 long or short). Alternatively, a telescopic actuator may be provided separately from the tilt actuator 48. For the illustration of the telescopic actuator, the illustration of the tilt actuator 48 in FIGS. 9 and 13 may be employable. In such case, in the second embodiment, a telescopic length L shown in FIG. 10 may be changed instead of the tilt angle $\gamma$ as a means for giving notice to the driver of the transition to the high angle ratio mode. Further, in the third embodiment, the steer angle ratio mode may be switched by changing the telescopic length L instead of changing the tilt angle $\gamma$.

(C) In the second and third embodiments, the reference position $\gamma_0$ of the tilt angle is set to the highest position. However, the lowest position or an intermediate position may be set as the reference position $\gamma_0$. When the reference position $\gamma_0$ is set to the intermediate position, the steer angle ratio mode may be switched when the driver raises or lowers the steering wheel 91 from the reference position $\gamma_0$ by the change amount threshold value or more.

(D) In the steer angle ratio change permission/prohibition determination step shown at S13, S23 of the flowchart, any one of the three conditions of the steering angle $\theta s$, the steering torque Ts, and the vehicle speed V may be omitted, or in addition to that, the conditions regarding other parameters may be determined/considered. For example, the steering angular velocity $\omega s$, road surface conditions such as the friction coefficient, driver's aptitude information and the like may also be used for determination. Further, the parameters and the determination threshold may be different among (a) a normal to high-ratio mode transition and (b) a high-ratio to normal mode transition.

(E) Although the steer angle ratio mode in the above embodiment is two stages, i.e., the normal mode and the high angle ratio mode, the steer angle ratio mode of three or more stages may be settable. Further, for example, when the steer angle ratio difference is relatively small and the influence of the steer angle ratio change on the steering stability is small even in case that the steer angle ratio is changed during steering or high speed travel, etc., the change of the steer angle ratio mode may always be permitted.

(F) The reaction force actuator and the turning actuator are not limited to the electric motor that generates the rotational output, but may also be a linear actuator or a hydraulic actuator that generates a linear output. The same applies to the tilt actuator and the telescopic actuator.

The present disclosure should not be limited to the embodiments described above, and various other embodiments are implementable without departing from the scope of the present disclosure.

What is claimed is:

1. A steering controller applied to a steer-by-wire system having a steering device and a tire turning device that are mechanically-separated from each other, the steering controller comprising:
a reaction force actuator in the steering device rotating a steering wheel for causing a reaction force to a steering operation of the steering wheel;
a turning actuator in the tire turning device turning a tire;
an input device for an input of a steer angle ratio mode having at least one of a normal mode and a high angle ratio mode according to a driver selection, the normal mode set as a reference value and the high angle ratio mode set as a high angle ratio value higher than the reference value based on a steer angle ratio of a tire turning angle against a steering angle of the steering wheel; and
a control section controlling an output of the reaction force actuator and an output of the turning actuator based on the input of the steer angle ratio mode of the input device, wherein
the control section is configured to control a reaction force amount based on road surface information calculated from the output of the turning actuator and a viscosity compensation amount negatively correlated with a steering speed of the steering device, and
(i) decreases an absolute value of the reaction force amount and increases an absolute value of the viscosity compensation amount when transitioning from the normal mode to the high angle ratio mode, and (ii) increases an absolute value of the reaction force amount and decreases an absolute value of the viscosity compensation amount when transitioning from the high angle ratio mode to the normal mode.

2. The steering controller of claim 1, wherein
when transitioning from the normal mode to the high angle ratio mode, the control section decreases the absolute value of the reaction force amount and then increases the steer angle ratio, and then increases the absolute value of the viscosity compensation amount, and
when transitioning from the high angle ratio mode to the normal mode, the control section decreases the absolute value of the viscosity compensation amount and then decreases the steer angle ratio, and then increases the absolute value of the reaction force amount.

3. The steering controller of claim 1, wherein
when an absolute value of the steering angle or an absolute value of the tire turning angle is equal to or greater than an angle threshold value ($\theta s$ or $\theta t$), the control section prohibits change of the steer angle ratio mode.

4. The steering controller of claim 1, wherein
when a vehicle speed is equal to or greater than a speed threshold value (V_th), the control section prohibits change of the steer angle ratio mode.

5. The steering controller of claim 1, wherein
the input device is a high angle ratio switch operable by a driver.

6. The steering controller of claim 5 further comprising:
a tilt actuator for adjusting a tilt angle of the steering wheel or a telescopic actuator for adjusting a telescopic length of a steering column, wherein
the control section notifies the driver of change of the steer angle ratio mode by changing at least one of the tilt angle and the telescopic length.

7. The steering controller of claim 1, wherein
when a driver changes a tilt angle or a telescopic length of the steering wheel, the steering wheel receiving the change of the tilt angle or the telescopic length functions as the input device.

8. A method of steering control, comprising:

rotating a steering wheel for causing a reaction force to a steering operation of the steering wheel turning a tire;

inputting a steer angle ratio mode having at least one of a normal mode and a high angle ratio mode according to a driver selection, the normal mode set as a reference value and the high angle ratio mode set as a high angle ratio value higher than the reference value based on a steer angle ratio of a tire turning angle against a steering angle of the steering wheel; and controlling an output of a reaction force actuator and an output of a turning actuator based on the input of the steer angle ratio mode of an input device, wherein the method further includes:

controlling a reaction force amount based on road surface information calculated from the output of the turning actuator and a viscosity compensation amount negatively correlated with a steering speed of a steering device, and decreasing an absolute value of the reaction force amount and increasing an absolute value of the viscosity compensation amount when transitioning from the normal mode to the high angle ratio mode, and increasing an absolute value of the reaction force amount and decreasing an absolute value of the viscosity compensation amount when transitioning from the high angle ratio mode to the normal mode.

* * * * *